United States Patent
Maliszewski et al.

(10) Patent No.: US 6,662,060 B1
(45) Date of Patent: Dec. 9, 2003

(54) METHOD AND APPARATUS FOR MULTIMEDIA PLAYBACK WITH TITLE SPECIFIC PARAMETERS

(75) Inventors: Richard L. Maliszewski, Forest Grove, OR (US); Brendan S. Traw, Portland, OR (US); James A. Moorer, San Rafael, CA (US); Alan J. McPherson, Chatsworth, CA (US); George H. Lydecker, Burbank, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/420,185

(22) Filed: Oct. 18, 1999

(51) Int. Cl.⁷ .................................................. H04N 7/04
(52) U.S. Cl. .............................. 700/94; 386/95; 386/96; 386/105
(58) Field of Search ................................. 709/217, 219; 369/47.15, 47.25; 386/125, 126, 105, 95, 96; 700/94

(56) References Cited

U.S. PATENT DOCUMENTS

| | | | |
|---|---|---|---|
| 5,923,754 A | * 7/1999 | Angelo et al. | 705/54 |
| 5,987,417 A | * 11/1999 | Heo et al. | 369/59.21 |
| 6,035,329 A | * 3/2000 | Mages et al. | 709/217 |
| 6,215,743 B1 | * 4/2001 | Kamatani | 369/47.15 |
| 6,222,805 B1 | * 4/2001 | Mori et al. | 369/275.3 |
| 6,351,467 B1 | * 2/2002 | Dillon | 370/432 |
| 6,377,862 B1 | * 4/2002 | Naruki et al. | 381/104 |
| 6,381,403 B1 | * 4/2002 | Tanaka et al. | 709/219 |
| 6,389,463 B2 | * 5/2002 | Bolas et al. | 709/216 |
| 6,560,403 B1 | * 5/2003 | Tanaka et al. | |
| 6,567,371 B1 | * 5/2003 | Otomo et al. | |

* cited by examiner

Primary Examiner—Minsun Oh Harvey
Assistant Examiner—Brian Pendleton
(74) Attorney, Agent, or Firm—Steven P. Skabrat

(57) ABSTRACT

Playback of digital multimedia content by a player application may be modified according to title specific parameters. The method includes accessing the digital multimedia content, accessing title specific parameters associated with the digital multimedia content, and processing the digital multimedia content to render the content to a user according to the title specific parameters. The title specific parameters may be stored with the digital multimedia content on a removable storage medium such as a digital versatile disk (DVD) or received from a source over a computer network, satellite, or cable. The title specific parameters may be used to modify at least one of the decoding, decompressing, and downsampling of at least one track or title of the content. In one embodiment, the content is digital audio data in the DVD-Audio format.

8 Claims, 3 Drawing Sheets

METHOD AND APPARATUS FOR MULTIMEDIA PLAYBACK WITH TITLE SPECIFIC PARAMETERS

BACKGROUND

1. Field

The present invention relates generally to multimedia in computer and consumer electronics systems and, more specifically, to authoring and playing of multimedia data streams.

2. Description

Digital multimedia encoders and decoder/render engines are typically designed for one of several well-known protocols or data formats. These protocols are defined to provide a "best-fit", "one size fits all" solution for digital content mastering and playback. For example, digital audio stored on a compact disc read only memory (CDROM) may be sampled at 44 kHZ with two channel stereo and 16 bits per data unit. This approach sacrifices some fidelity for almost every content sample due to the need to "clip" or downsample some of the original content in order to fit it into a prescribed storage and playback format. Fidelity clearly suffers on playback when the content to be played differs greatly from the expected norm. For example, rendering a classical music sample having a broad dynamic frequency range according to a protocol generally used for modern popular music or spoken word recordings may result in poor overall fidelity on playback.

With the advent of digital versatile disks (DVDs), this problem is exacerbated because of the extended storage capabilities of the DVD. With greater storage available, content creators may author content having a greater dynamic range and better sample size than before and still fit the content on a DVD. For storage on a DVD, digital audio may be sampled at 96 kHZ, with six channels and 24 bits per data unit. However, to render this content on a personal computer (PC), the data is downsampled into another format, such as the "consumer quality" pulse code modulation (PCM) format, for example. PCM provides for audio data at a sample rate of 48 kHZ, with two channels and a sample size of 16 bits.

Recently, DVD audio has emerged as a new multimedia technology. DVD-Audio is a separate format from the well-known DVD-Video used for motion pictures and other audio-visual content. DVD-Audio is defined in the DVD-Audio 1.0 specification published in March, 1999, and available from the DVD Forum, an industry consortium (see http://www.dvdforum.org on the Internet). For security reasons, licensing restrictions require DVD-Audio data to be downsampled to consumer quality PCM on a PC. Despite the encryption features of DVD-Audio, content owners are wary of the potential for piracy if the original, full fidelity content is available on the PC. Because of the downsampling, the content is rendered on the PC or other digital consumer electronics device in a sub-optimal manner. This is disliked by many content authors, who see their creative works being rendered in a form that is inferior to the form in which it was created and intended to be seen or heard.

What is needed is a mechanism for allowing content authors to control how their works are rendered on a digital playback device such as a personal computer (PC) or consumer electronics equipment supporting digital multimedia.

SUMMARY

An embodiment of the present invention is a method of playback of digital multimedia content by a player application according to title specific parameters. The method includes accessing the digital multimedia content, accessing title specific parameters associated with the digital multimedia content, and processing the digital multimedia content to render the content to a user according to the title specific parameters. The title specific parameters may be stored on a storage medium (such as a DVD), along with the digital multimedia content.

Another embodiment of the present invention includes an article comprising digital multimedia content and title specific parameters to be used to control at least one of decrypting, decompressing, decoding and downsampling of the digital multimedia content prior to rendering to a user.

Other embodiments are described and claimed.

BRIEF DESCRIPTION OF THE DRAWINGS

The features and advantages of the present invention will become apparent from the following detailed description of the present invention in which.

DETAILED DESCRIPTION

Figure 1:
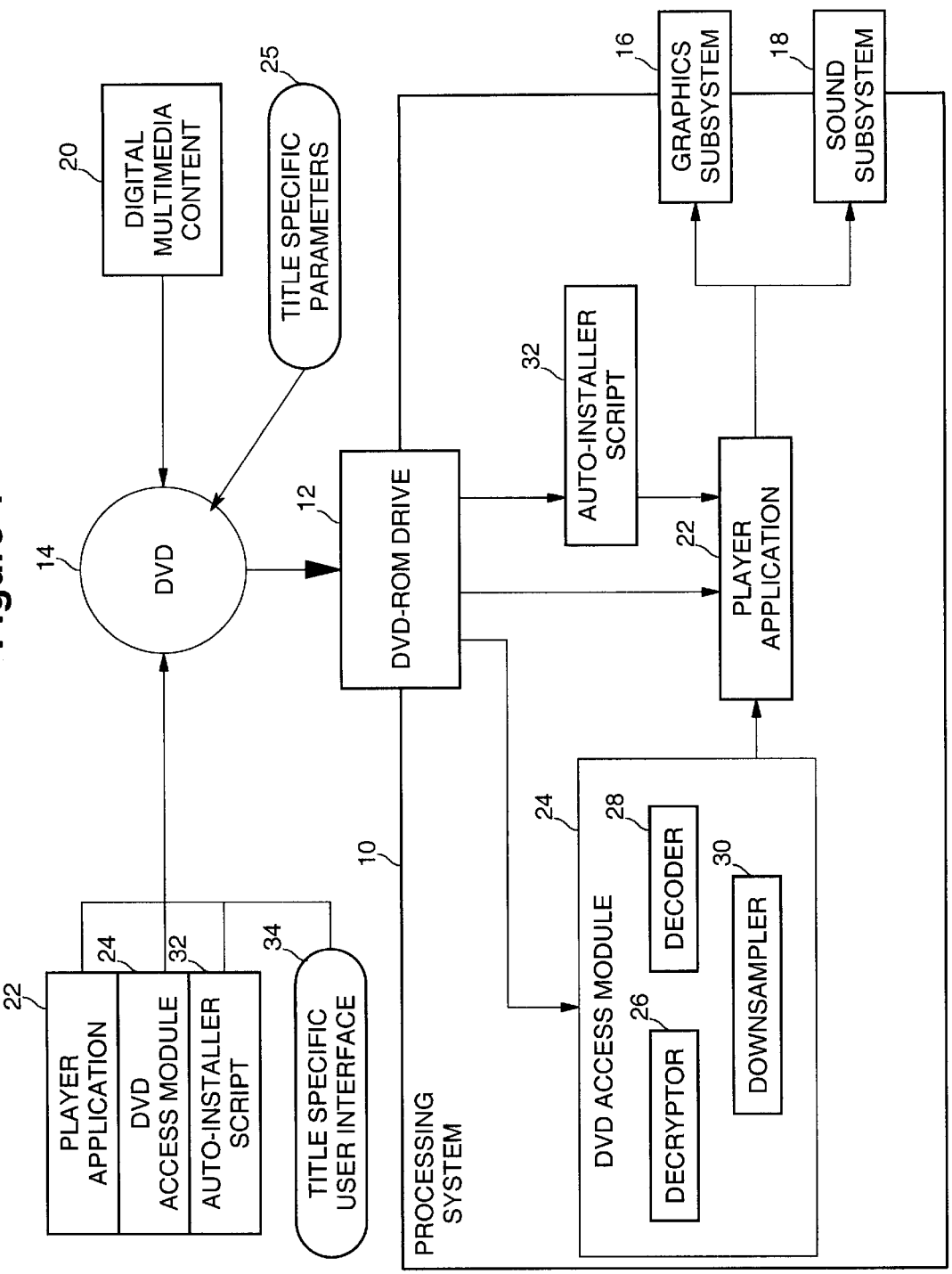
FIG. 1 is a diagram of a playback system for rendering content in a title specific manner according to an embodiment of the present invention.

An embodiment of the present invention is a multimedia playback device that provides parameterizable decompression, decoding, downsampling, and rendering of digital multimedia content, such as digital audio data. Content authors may specify, during the content mastering process, how the content may be processed and rendered to the user. This control information, called title specific parameters herein, may be stored along with the content and distributed to a user. The control information may be used to control the decompression, decoding, downsampling, rendering, or subsequent processing of the content during playback. This control data may be tailored to the specific content to be played such as a content title, and even individual tracks of a title, and thus may provide a higher level of user experience for that content.

In one embodiment of the present invention, a secure automatic playback system uses removable mass storage media such as a DVD to store the content in DVD-Audio format. This embodiment describes a method for bundling title specific parameters with the content and a player application on a DVD, and how the player application may be used to securely and automatically render the content on a PC or other device in a title specific manner.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In one embodiment, the invention may be used for playing DVDs storing DVD-Audio data, although in other embodiments the method and system of the present invention may be used with any digital multimedia content encoded on any mass storage medium now known or hereafter developed, or with any such content that is delivered through any means, and consumed and rendered without local storage. The DVD-Audio 1.0 specification, published in March, 1999, includes formats and features not available in the DVD-Video format, with content stored in a separate "DVD-Audio zone" on a disk. DVD-Audio supports linear pulse code modulation (LPCM) audio data, with up to six channels at sample rates of up to 96 kHz, and sample sizes of up to 24 bits. This allows a frequency response of up to 48 kHz and dynamic range of up to 144 decibels (dBs). Multichannel PCM data may be downmixed by a player application. Sampling rates and sizes may vary for different channels by using a predefined set of groups. The maximum data rate is 9.6 Mbps. DVD-Audio uses Meridian Lossless Packing (MLP) compression scheme to remove redundancy from the signal to achieve a compression ratio of about 2:1 while allowing the PCM signal to be completely recreated by a MLP decoder. MLP allows playing time of about 74–135 minutes of six channel 96 kHZ/24 bit audio on a single layer of a disk.

DVD-Audio includes specialized downmixing features for PCM channels. Unlike DVD-Video, where a decoder controls mixing six channels down to two, DVD-Audio includes coefficient tables to control mixdown and avoid volume buildup from channel aggregation. Up to 16 tables may be defined by each audio title set (e.g., an album), and each track may be identified with a table. Coefficients may range from 0 dB to 60 dB. DVD-Audio allows up to 16 still graphics per track, with a set of limited transitions. On-screen displays may be used for display of synchronized lyrics and navigation menus.

Because of the extended storage capacities and other features of DVD-Audio formatted media described above, new capabilities may be provided to content owners and users. FIG. 1 is a diagram of a secure automatic playback system for rendering content in a title, specific manner according to an embodiment of the present invention. A processing system 10 includes a DVD-ROM drive 12. The processing system may be a personal computer (PC) system, for example. DVD-ROM drive 12 is capable of reading data from a digital versatile disk (DVD) 14 and communicating the data to other components in the system. In one embodiment, the DVD includes data formatted according to the DVD-Audio specification. The processing system may include well-known graphics subsystem 16 for rendering images on a display (not shown) coupled to the system, and well-known sound subsystem 18 for producing sounds through loudspeakers (not shown) coupled to the system. Graphics subsystem and sound subsystem perform their conventional functions that are well known in the art, and thus will not be described further herein.

DVD 14 includes digital multimedia content 20. In various embodiments, digital multimedia content comprises one or more of audio content, video content, textual data, images, and other binary data. In one embodiment, the digital multimedia content is DVD-Audio data. This content is written to the DVD in the typical manner during the manufacturing process. In embodiments of the present invention, DVD 14 also contains various other software and data. Player application 22 comprises software or firmware that accepts audio and visual data and causes this data to be rendered by the graphics and sound subsystems. DVD access module 24 comprises software to control access to the data stored on the DVD. In one embodiment, a distinct version of the DVD access module 24 may be used with each individual DVD title (wherein a title is an individual work comprising digital content). Title specific parameters 25 comprise zero or more decompression, decoding, downsampling, and rendering control parameters for each title, and, optionally, for each track of each title. Control parameters may include filter characteristics, spatial related transfer characteristics, individual channel characteristics (e.g., level, phase, equalization (EQ), and positioning data), sample rate compression specifications, transformation rates, protocols to be used for downsampling, downsampling algorithms to be used (e.g., decrease samples by averaging, channel conversions, and compression of dynamic range), and other playback processing directives. If the player application does not recognize any one of the title specific parameters, the player application ignores the parameter.

DVD access module 24 comprises at least three components. Decryptor 26 obtains encrypted data from DVD-ROM drive 12, checks the copy control information embedded within the data to verify that playback is authorized, and uses cryptographic keys stored in the DVD to decrypt the encrypted data. Decoder 28 decompresses the decrypted data and decodes the data into high fidelity LPCM format. Decoder 28 may use title specific parameters 25 to decode and decompress the data. Downsampler 30 converts the LPCM data into a lower fidelity PCM format suitable for processing by the sound subsystem of the processing system. In one embodiment, the PC format has a 48 kHz sample rate and a sample size of 16 bits. Downsampler 30 uses title specific parameters 25 obtained from the DVD to perform the downsampling in the manner specified. In this way, the content author may control how the content is processed on the user platform. The content author no longer needs to compromise during content creation and mastering because the content author may specify how the specific title and tracks will be processed and rendered to the user. In controlling the rendering of the content, player application 22 may also use title specific parameters 25 to modify the presentation of the content to the user. For example, the sound characteristics of an audio track may be controlled via the title specific parameters.

In one embodiment, auto-installer script 32 is loaded from the DVD into a memory within the processing system and automatically executed to load, install and commence execution of the player application and the DVD access module. Title specific user interface 34 comprises data and software that is specific to a given DVD title (e.g., a movie, album, game, etc.). The player application may use the title specific user interface to customize the visual presentation of the digital multimedia content to the user. For example, the title specific user interface may specify a different "look and feel" for the graphical user interface of the player application for each DVD or even each individual track on a DVD. In one embodiment, the title specific user interface comprises at least one graphical image file for display by the graphics subsystem for a particular DVD.

In one embodiment of the present invention described in FIG. 1, a secure automatic playback system uses removable mass storage media such as a DVD to store the content in DVD-Audio format. This embodiment describes a method for bundling title specific parameters with the content and a player application on a DVD, and how the player application may be used to securely and automatically render the content on a PC or other device in a title specific manner. In an alternative embodiment, the player application may be omitted from the storage medium (e.g., the DVD). Instead, the player application may be loaded independently to a PC.

In another embodiment, the player application may already be a part of a consumer electronics (CE) device (such as a DVD player), and the storage medium includes the content and the title specific parameters, but not the player application. In yet another embodiment, the content and accompanying title specific parameters may be communicated to a user's CE device or PC (each device having a player application capable of rendering the content and implementing the title specific parameters) by any known means of communicating data, such as by a computer network (e.g., the Internet), satellite, or cable television lines, for example, rather than by a removable storage medium such as a DVD. In other embodiments, the digital multimedia content may comprise audio-visual data, rather than only DVD-Audio data.

Figure 2:
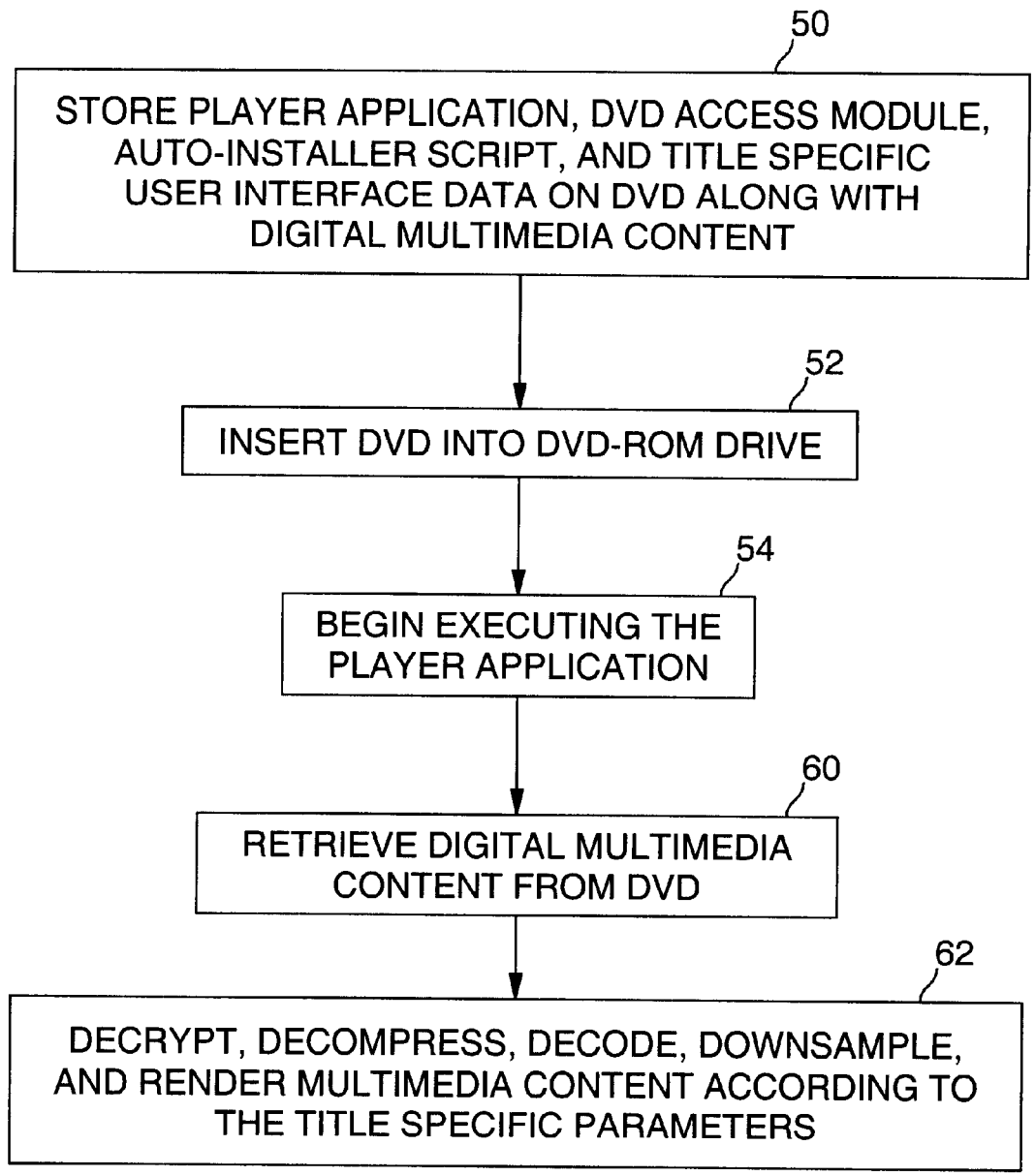
FIG. 2 is a flow diagram illustrating the operation of a playback system for rendering content in a title specific manner according to an embodiment of the present invention.

FIG. 2 is a flow diagram illustrating the operation of a secure automatic playback system for rendering content in a title specific manner according to an embodiment of the present invention. At block 50, the player application, the DVD access module, the auto-installer script, the title specific parameters, and the title specific user interface information may be stored on the DVD along with the digital multimedia content. This action may be performed at the time of manufacturing of the DVD. The content owner may also specify and/or modify the title specific parameters and title specific user interface depending on artistic choices and marketing goals. Because of the large capacity of DVDs, these extra components may be stored on the disk along with the typical multimedia content. In other embodiments not relying on a removable storage medium, the title specific parameters and title specific user interface may be bundled with the content during transmission to a user's receiving device. In cases where the DVD is physically distributed to a user (e.g., through a sales distribution channel or other means), the user inserts the DVD into the DVD-ROM drive of the processing system at block 52.

Next, at block 54, the player application begins executing. At block 60, the player application obtains the digital multimedia content from the DVD via the DVD access module. At block 62, the DVD access module decrypts, decompresses, decodes, and downsamples the multimedia data. The decoding, decompressing, and downsampling may be performed according to the title specific parameters obtained from the DVD. The resulting data may be passed to the player application for rendering on the graphics subsystem and the sound subsystem according to the title specific parameters.

Embodiments of the present invention provide at least several advantages over existing systems. The content owner has additional control over the presentation of the content to the end-user. All aspects of the user interface and content rendering may be customized for the specific content. For example, the user interface elements and decompression, decoding, and downsampling processing may be modified for each film, artist, disk, song, track, or title.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the playback device components includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 3:
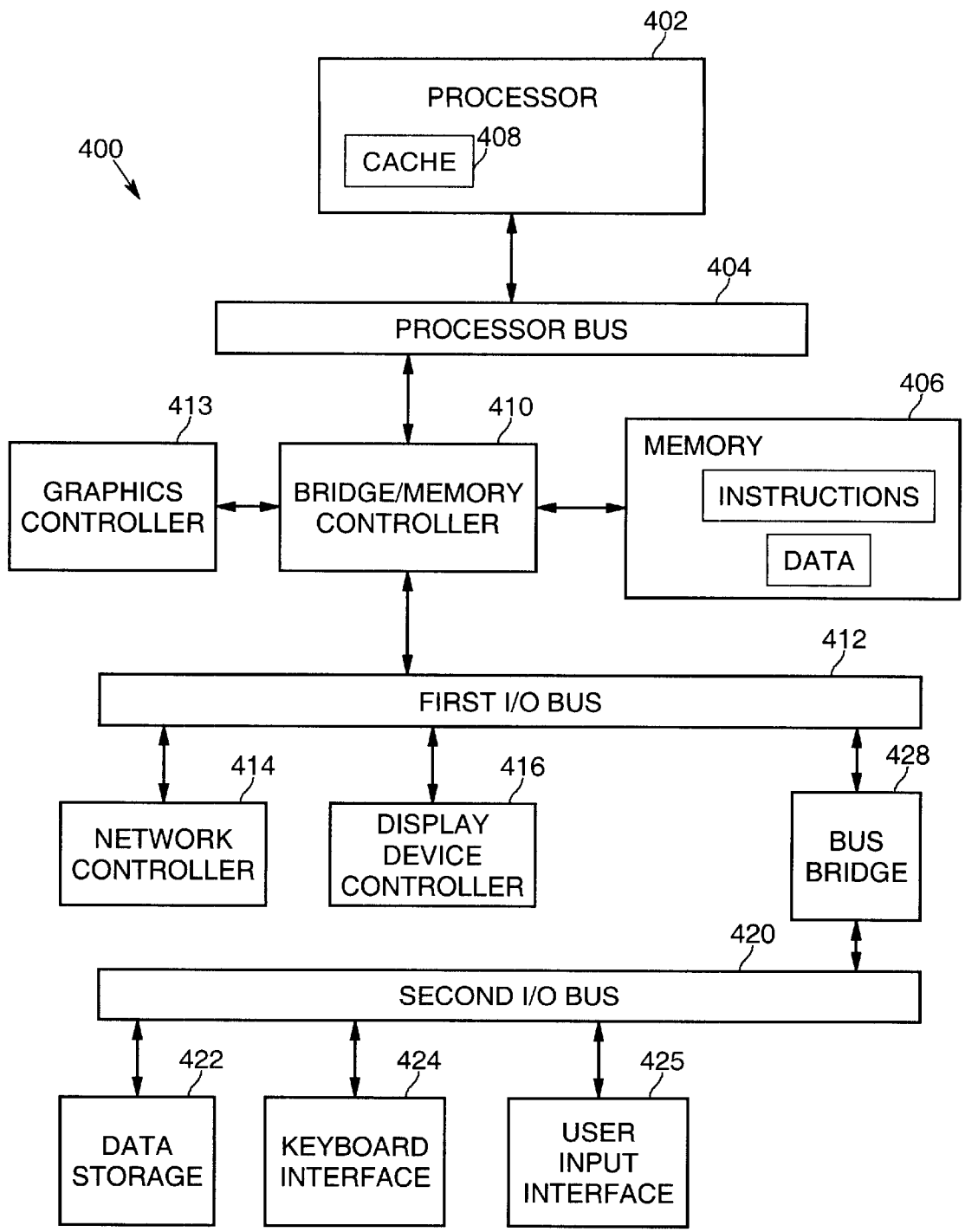
FIG. 3 is a diagram illustrating a sample processing system capable of being operated as a playback system for rendering content in a title specific manner according to an embodiment of the present invention.

An example of one such type of processing system is shown in FIG. 3, however, other systems may also be used and not all components of the system shown are required for the present invention. Sample system 400 may be used, for example, to execute the processing for embodiments of the secure automatic playback system for rendering content in a title specific manner, in accordance with the present invention, such as the embodiment described herein. Sample system 400 is representative of processing systems based on the PENTIUM®II, PENTIUM® III, and CELERON™ microprocessors available from Intel Corporation, although other systems (including personal computers (PCs) having other microprocessors, engineering workstations, other set-top boxes, and the like) and architectures may also be used.

FIG. 3 is a block diagram of a system 400 of one embodiment of the present invention. The system 400 includes a processor 402 that processes data signals. Processor 402 may be coupled to a processor bus 404 that transmits data signals between processor 402 and other components in the system 400.

System 400 includes a memory 406. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the computer system. A bus bridge 428 couples first I/O bridge 412 to second I/O bridge 420.

Embodiments of the present invention are related to the use of the system 400 as a playback device for rendering of content in a title specific manner. According to one embodiment, such processing may be performed by the system 400 in response to processor 402 executing sequences of instructions in memory 404. Such instructions may be read into memory 404 from another computer-readable medium, such as data storage device 422 (which may be a DVD), or from another source via the network controller 414, for example. Execution of the sequences of instructions causes processor 402 to execute content playback processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions in a manner well-known in the art. In particular, data storage device 422 (e.g., a DVD) may be used to provide long-term storage for the executable instructions and data structures for embodiments of the secure automatic playback system for rendering content in a title specific manner in accordance with the present invention, whereas memory 406 is used to store on a shorter term basis the executable instructions of embodiments of the secure automatic playback system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. An apparatus for secure automatic playback of digital multimedia content stored on a removable storage medium in an author-controlled title specific manner, comprising:
 a player application to render the digital multimedia content for a user;
 an auto-installer script for automatically installing the player application;
 at least one access module, bundled with the auto-installer script and the player application on the removable storage medium, to control access to the digital multimedia content; wherein the at least one access module includes
  a decryptor to decrypt the digital multimedia content to produce decrypted content according to the author-controlled title specific parameters,
  a decoder to provide a user with an interface according to the author-controlled title specific parameters and decode and decompress the decrypted content to produce decoded content in response to a user input, and
  a downsampler to downsample the decoded content to produce data for rendering, and wherein at least one of the decoding, decompressing, and
  downsampling is performed according to the author-controlled title specific parameters; and
 title specific parameters to be used by the access module to provide a user with an interface and control at least one of decrypting, decompressing, decoding and downsampling of the digital multimedia content, in an author controlled title specific manner.

2. The apparatus of claim 1, wherein the apparatus comprises a DVD-ROM drive and the removable storage medium comprises a digital versatile disk (DVD).

3. The apparatus of claim 1, wherein the removable storage medium comprises a digital versatile disk (DVD) and the digital multimedia content comprises audio data stored in a DVD-Audio format and graphics for on-screen displays controlled by the content author through the title specific parameters.

4. The apparatus of claim 1, wherein the author-controlled title specific parameters comprise at least one of filter characteristics, spatial related transfer characteristics, individual channel characteristics, sample rate compression specifications, transformation rates, downsampling algorithms to be used, user interface specifications, and protocols to be used for downsampling.

5. The apparatus of claim 1, wherein the access module is unique to each title of the digital multimedia content stored on the removable storage medium, according to the author-controlled title specific parameters.

6. An article comprising: a removable storage medium having a plurality of machine readable instructions and digital multimedia content, wherein when the instructions are executed by a processor, the instructions provide for the secure automatic playback of the digital multimedia content stored on the removable storage medium by an apparatus in an author-controlled title specific manner, the instructions including:
 a player application to render the digital multimedia content for a user;
 an auto-installer script for automatically installing the player application;
 at least one access module bundled with the auto-installer script and the player application on the removable storage medium to control access to the digital multimedia content through
  decrypting the digital multimedia content to produce decrypted content according to the author-controlled title specific parameters,
  providing a user with an interface according to the author-controlled title specific information, decoding and decompressing the decrypted content to produce decoded content, and downsampling the decoded content to produce data for rendering according to the author-controlled title specific parameters in response to a user input; and author-controlled title specific parameters to be used by the access module to provide a user with an interface and control at least one of decoding, decompressing and downsampling of the digital multimedia content, in an author-controlled title specific manner.

7. The article of claim 6, wherein the removable storage medium comprises a digital versatile disk (DVD) and the digital multimedia content comprises audio data stored in a DVD-Audio format and graphics for on-screen displays controlled by the content author through the title specific parameters.

8. The article of claim 6, wherein the instructions for the access module further comprise instructions for uniquely accessing each title or track of the digital multimedia content stored on the removable storage medium, according to the author-controlled title specific parameters.

* * * * *